June 2, 1953     S. C. CALDWELL     2,640,528
DISLODGING TOOL FOR PNEUMATIC TIRES
Filed Aug. 30, 1948
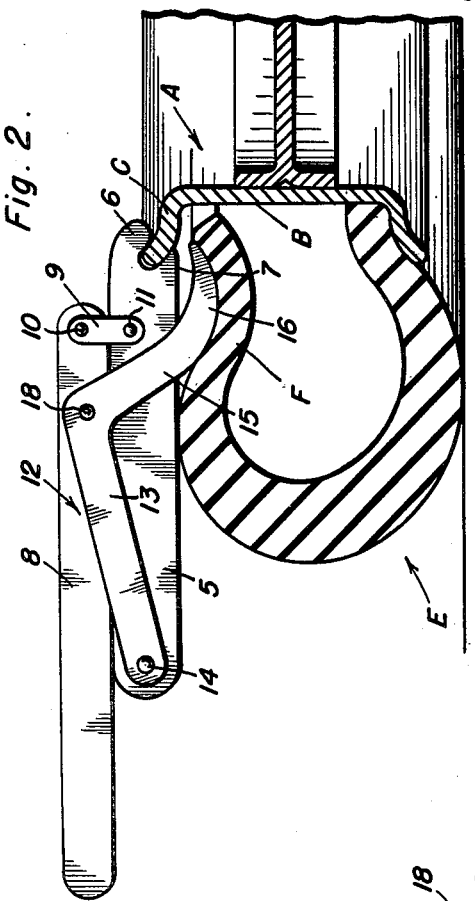
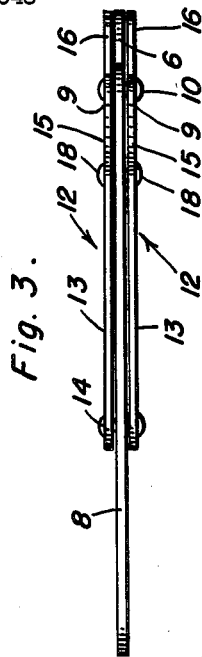
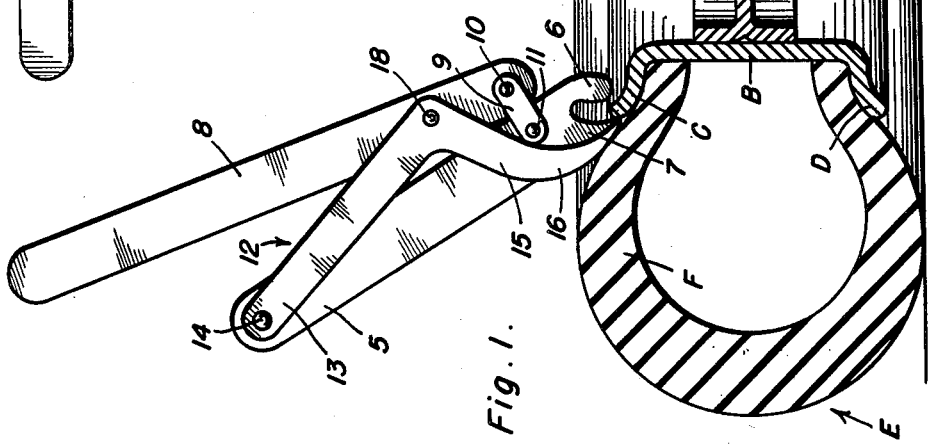
Smith C. Caldwell
INVENTOR.

Patented June 2, 1953

2,640,528

UNITED STATES PATENT OFFICE 2,640,528

DISLODGING TOOL FOR PNEUMATIC TIRES

Smith C. Caldwell, Livingston, Mont.

Application August 30, 1948, Serial No. 46,788

1 Claim. (Cl. 157—1.17)

The present invention relates to hand-type tire tools and has reference in particular to a tool of the type which is temporarily and firmly attached to the tire supporting rim and which is constructed to exert pressure against a side wall of the tire casing in a manner to facilitate the steps of either mounting or demounting said casing.

Those familiar with tire tools such as are used by motorists, but primarily used in service garages are aware that there are, in this field of endeavor, many and varied types, styles and forms of tools. Therefore, to categorize the present invention it is to be stated that it appertains, primarily, to the rim attached type, that is, where means is provided to temporarily mount the tool on the conventional rim, usually on the flange of the latter, said means serving to support all other necessary parts employed in constructing the finished tool.

An object of the invention is to structurally, functionally and otherwise improve upon tire tools in the field of invention under advisement through the medium of a tool of general toggle-like form, the same being characterized by a readily attachable and detachable adapter unit or bar which engages and fits releasably on the rim flange and serves as a foundation or support for a simple straight hand lever, and an arrangement of coacting L-shaped pressure applying lever, the latter being actuable by the hand lever and so constructed as to apply the thrust pressure against the coacting wall of the casing so as to flex the latter sufficiently to facilitate accomplishment of the wanted results.

More specifically, novelty is predicated upon a rigid rectilinearly straight bar constituting the stated adapter unit, the same having jaws at its rim flange engaging end, said jaws being releasably engageable with the rim flange so that the adapter may be readily applied and swung down to an approximately horizontal position at right angles to the felly portion of the rim where it functions with requisite efficiency to properly support and permit operation of the coacting hand lever and L-shaped levers.

Other objects and advantages will become more readily apparent from the following description and the accompanying illustrative drawings.

In the drawings:

Figure 1 is an elevational view of a tire tool constructed in accordance with the principles of the present invention showing the same being applied to the flange of the tire supporting rim.

Figure 2 is a view based on Figure 1 and showing the tool completely engaged and the manner in which the parts work to put the coacting side wall of the tire casing under pressure for deformation and removal from the stated rim.

Figure 3 is a top plan view of the tool per se.

Referring now to Figures 1 and 2, old and well known parts embody a conventional type rim A including a felly portion B and flanges C and D. The letter E designates a pneumatic tire casing the wall F of which is adapted to be put under pressure, squeezed and thus deformed sufficiently to facilitate accomplishment of steps applied in either mounting or demounting the casing. I am interested, of course, only in the construction of the tool.

The tool, as before stated, comprises a linearly straight rigid adapter unit which in the instant arrangement is a one-piece metal or equivalent bar 5. The engageable end of the adapter unit is bifurcated and the furcations 6 and 7 constitute claw-like grips or jaws and they are shaped, depending on the shape of the rim flange, to fit the flange. That is to say, they are so made that it is possible to take the adapter 5 and to angle it to the approximate position seen in Figure 1 and to slip the jaws into attachable positions as brought out in Figure 2. The so-called inner or lower jaw 7 is pointed and generally wedge-shaped so that it may pry and wedge itself in between the wall F of the casing and the inner surface of the rim flange. When the adapter is fully situated in its usable position it assumes a horizontal position. That is to say, when the rim is residing on the ground or other surface as shown in Figure 2 the adapter is horizontal. Otherwise considered it may be said to simply take a position at right angles to the web or felly portion of the rim. In any event, when the adapter is applied to the rim it becomes a support or foundation for the other parts. A principal complemental part takes the form of a linearly straight rigid lever 8 and this may be of any suitable length. It is disposed in a plane with the adapter bar and is attached by spaced parallel links 9 in the manner shown.

More specifically, the links 9 are pivotally connected, as at 10, to one end of the lever and at their opposite ends they are pivotally connected as at 11 to the adapter at a point spaced inwardly from the jaws 6 and 7. The L-shaped element or levers, previously touched upon, are denoted broadly by the numerals 12. Each is of L-shaped form and the long arm 13 is here fashioned so that it may be pivoted at 14 to the outer end of the adapter bar. The short arm, in each instance, is denoted by the numeral 15 and has a curvate terminal which may be referred to as a pressure and thrust exerting toe 16. The toe is not only curved but of wedge-shaped form. The purpose here is to facilitate the step of wedging the jaws 6 and 7 initially into place. That is to say, the wedge shaped toes will loosen and deform the wall F slightly and thus pave the way for application of the jaws 6 and 7. It may be stated in connection with the phases of the construction under consideration that, so far as I know, no one has suggested the use of curvate wedge-shaped pressure toes forming parts of parallel companion L-shaped levers wherein said toes function to cam themselves in between the wall of the tire casing and rim flange and also pilot the way for insertion and attachment of a short wedge shaped jaw 7. At the point of connection or juncture of the arms 13 and 15 an assembling and pivotal connection 18 is provided and this serves to hingedly mount the L-shaped levers 12 on opposite sides of the hand lever 8. In fact, the hinge connection 18 is made adjacent the link connections 9, that is, the connections which link the lever 8 with the foundational adapter unit 5. With all of the parts properly proportioned and mechanically interconnected, a precision type tool is thus brought into being.

In practice, the adapter unit or bar 5 is placed at an inclined position as shown in Figure 1 and the jaws 7 and 8 are pressed against and connected with the rim flange C. The jaw 7 is self piloting and to assist in attaining the desired results, the pressure toes 16, functioning as wedges, come into play and assist the user in prying the casing loose and easily applying the tool. When the tool is applied the adapter takes a position at approximate right angles to the felly of the rim where it provides a base, allowing the hand lever 8 and L-shaped levers 12 to come into play to exert the wanted pressure against the wall F for dislodging same.

A careful consideration of the foregoing description in conjunction with the invention illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

A dislodging tool for pneumatic tires comprising a rigid linearly straight one-piece bar bifurcated and providing furcations defining rim-engaging jaws, a single straight lever extending along one longitudinal edge of and in a plane with said bar, a pair of links pivotally connecting one end of the lever with an intermediate portion of the bar at a point spaced from said jaws, and a pair of duplicate but individual L-shaped pressure and thrust exerting levers arranged on the respective opposite sides of said bar and straight lever, the free end portions of the long arms of said L-shaped levers being pivotally connected to the end of said bar which is opposite to the bifurcated end of the latter and the junctural portions of the respective long and short arms of said L-shaped levers being pivotally connected with the intermediate portion of said straight lever and said short arms obliquely straddling said bar with their free end portions extending beyond the other longitudinal edge of said bar, said free end portions of the short arms being wedge-shaped and curved to extend toward said rim-engaging jaws of the bar.

SMITH C. CALDWELL.

References Cited in the file of this patent

UNITED STATES PATENTS

| Number | Name | Date |
|---|---|---|
| 1,452,596 | De Fernelmont | Apr. 24, 1923 |
| 1,493,153 | Hartsock | May 6, 1924 |
| 1,507,208 | Schlenker | Sept. 2, 1924 |
| 1,559,355 | Oakley | Oct. 27, 1925 |
| 2,316,023 | Sauer | Apr. 6, 1943 |
| 2,319,155 | Passanante et al. | May 11, 1943 |
| 2,518,114 | Barber | Aug. 8, 1950 |